United States Patent Office 3,213,092
Patented Oct. 19, 1965

3,213,092
5-LOWER ALKANOYLAMINO-N-AMINO-METHYL-1,3,4-THIADIAZOLE AND 5-LOWER ALKANOYL-IMINO-4-LOWER ALKYL-$\Delta^2$-1,3,4-THIADIAZOLE-2-SULFONAMIDES
George M. Sieger, East Paterson, N.J., and William Barringer, Pearl River, N.Y., assignors to American Cyanamid Company, Stamford, Conn., a corporation of Maine
No Drawing. Filed June 26, 1962, Ser. No. 205,204
11 Claims. (Cl. 260—247.1)

This invention relates to new heterocyclic sulfonamide derivatives and salts thereof. More particularly, it relates to novel compounds produced by the Mannich reaction of heterocyclic sulfonamides with formaldehyde and secondary amines.

The preparation of acetazolamide was described in United States Patent 2,554,816 along with other thiadiazole sulfonamides. The preparation of related sulfonamides such as methazolamide has been described in United States Patent 2,783,241 along with related derivatives. Acetazolamide can be described chemically as 5-acetamido-1,3,4-thiadiazole-2-sulfonamide while methazolamide is described chemically as 5-acetylimino-4-methyl-$\Delta^2$-1,3,4 - thiadiazoline - 2 - sulfonamide. These compounds have been widely used in the past for their diuretic activity.

We have now found that these compounds when reacted with formaldehyde and a secondary amine produce highly desirable diuretics having the following structure:

$$\begin{array}{c} X-N \\ \| \quad \| \\ S-C-SO_2NH.CH_2N \diagdown \begin{array}{c} R \\ R' \end{array} \end{array}$$

wherein X is a divalent radical of the group consisting of

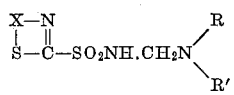

and

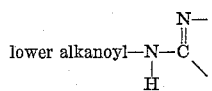

radicals and R and R' are hydrogen, lower alkyl and carboxy-lower alkyl and when taken together with the nitrogen atom form a heterocyclic ring.

The novel compounds of the present invention are, in general, crystalline solids having higher solubility than the corresponding sulfonamides and in general being more soluble than their corresponding salts.

The present compounds are prepared by reacting a compound having the formula:

$$\begin{array}{c} X-N \\ \| \quad \| \\ S-C-SO_2NH_2 \end{array}$$

wherein X is a divalent radical of the group consisting of

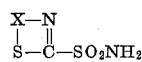

and

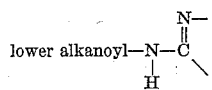

with formaldehyde and an amine having the formula:

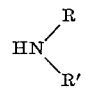

in which R and R' are lower alkyl and when taken together with the nitrogen atom form a heterocyclic ring. The secondary amines described above can be, for example, dimethylamine, diethylamine, dipropylamine, dibutylamine, diisobutylamine, piperidine, pyrrolidine, morpholine, piperazine and the like.

The reaction to prepare the compounds of the present invention can be carried out at a temperature ranging from about 0° to about 50° C., however, the reaction is preferably conducted at about room temperature which is from about 20° C. to about 25° C. The reaction at room temperature is usually complete in a period of from one hour to twelve hours.

The use of acetazolamide and methazolamide in liquid preparations in the past has suffered from the undesirable taste of the compositions. On the other hand, the compounds of the present invention, while retaining their diuretic activity, are much more desirable from the standpoint of taste. Also, in the past acetazolamide and methazolamide in the form of their sodium salts have been dissolved in water and lyophillized in small vials to be used for parenteral reconstitution. Usually the lyophillized product resembles a small plug adhering to the side of the vial. On the other hand, the corresponding water soluble Mannich bases in the form of their sodium salt produces a fluffy evenly distributed product when dissolved and subsequently lyophillized in small vials. The aesthetic appearance of the product is vastly improved and renders it more elegant and acceptable to the medical profession.

The reaction of acetazolamide and methazolamide with formaldehyde and a secondary amine are believed to produce the compounds shown hereinbefore wherein the formaldehyde and secondary amines react with a hydrogen of the sulfonamide starting material. The infrared spectrum of the compounds indicates that this reaction takes place. In order to have a more useful disclosure, the structure of the new compounds has been indicated, however, should further evidence in the future show that the reaction takes place at some other point on the original molecule, it is considered that the present invention is the reaction of sulfonamides hereinbefore described with formaldehyde and secondary amines and the products being claimed are the result of this reaction.

The optimum solubility of the compounds of the present invention in aqueous solution is obtained by preparing the corresponding metal, such as sodium, or amine, such as monoethanolamine, salts in water. In this manner, aqueous solutions of the compounds in concentrations up to 10% w./v. or greater can be obtained. The 10% w./v. aqueous solutions of monoethanolamine salts are more desirable for pharmaceutical applications than the corresponding sodium salt solution since they can be effected at a lower pH (about 8.5) as compared to that required to solubilize the sodium salt (about 9.0). These

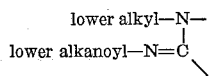

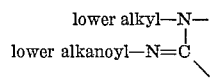

aqueous solutions permit the formulating of diuretic preparations for parenteral use.

The following examples describe in detail the preparation of Mannich bases of heterocyclic sulfonamides of the present invention.

EXAMPLE 1

*5-acetamido-N-piperidinomethyl-1,3,4-thiadiazole-2-sulfonamide*

Into 50 ml. of methanol is added 5.5 g. (0.025 mole) of 5-acetamido-1,3,4-thiadiazole-2-sulfonamide and 5 ml. (4.31 g., 0.05 mole) of piperidine. A clear solution results. To the solution is added 5 ml. (0.067 moles) of 37% formaldehyde solution. At this point the solution becomes cloudy, a precipitate forms and a slight exothermic reaction is observed. The reaction mixture is permitted to stand at room temperature overnight. The condensation product is filtered and dried under reduced pressure at 40–60° C. Yield, 6.5 g. (81.8%). The product melts at about 180–182° C. with some decomposition.

EXAMPLE 2

*Hydrochloride salt of 5-acetamido-N-piperidinomethyl-1,3,4-thiadiazole-2-sulfonamide*

To 20 ml. of isopropanol is added is added 1 g. (0.003 mole) of 5-acetamido-N-piperidinomethyl-1,3,4-thiadiazole-2-sulfonamide (compound of Example 1) and a molar excess of concentrated hydrochloric acid (2 ml.). The resulting reaction mixture is stirred for one hour. The product is filtered and washed with a small volume of petroleum ether. Weight: 500 mg. (yield, 45%); it melts with some decomposition at about 150–154° C.

EXAMPLE 3

*5-acetylimino-4-methyl-N-piperidinomethyl-$\Delta^2$-1,3,4-thiadiazole-2-sulfonamide*

Into 15 ml. of methanol is placed 2 g. (0.009 mole) of 5-acetylimino-4-methyl-$\Delta^2$-1,3,4-thiadiazole-2-sulfonamide and 2 ml. (1.72 g., 0.02 mole) of piperidine. To the clear solution that forms is added 2 ml. (0.027 mole) of 37% formaldehyde solution. The reaction mixture is stirred a total of one hour. Within about five minutes a condensation product begins to form and separates from the solution. At the end of the hour the product is filtered, washed with a little cold methanol and dried under reduced pressure at 40–45° C. Yield, 1.5 g. (50%). The product melts about 138–140° C. with some decomposition.

EXAMPLE 4

*5-acetamido-N-morpholinomethyl-1,3,4-thiadiazole-2-sulfonamide*

The 5-acetamido-1,3,4-thiadiazole-2-sulfonamide is suspended with stirring in 25 ml. of methanol and 5 ml. of morpholine added. After about five minutes 5 ml. of 37% formaldehyde is added and the mixture stirred for about one hour. At no point during the reaction procedure is a clear solution obtained. The product is collected by filtration and dried under reduced pressure. A yield of 4.7 grams is obtained.

EXAMPLE 5

*The preparation of 5-acetamido-N-morpholinomethyl-1,3,4-thiadiazole-2-sulfonamide hydrochloride*

A portion of 500 mg. of 5-acetamido-N-morpholinomethyl-1,3,4-thiadiazole-2-sulfonamide is suspended in 10 ml. isopropanol and hydrogen chloride gas bubbled through the mixture for about one minute. The reaction mixture is then allowed to stand for one hour at room temperature. The product is precipitated by the addition of 20 ml. petroleum ether, collected by filtration and dried under reduced pressure.

EXAMPLE 6

In order to determine the relative solubilities of the present compounds and compare them to the starting compounds, a series of tests were conducted. These tests are summarized in the following Table I.

TABLE I.—SOLUBILITY STUDIES

| No. | Type Compound | Approximate Solubility in $H_2O$ at Room Temperature | | Approximate Solubility in Propylene Glycol at Room Temperature | |
|---|---|---|---|---|---|
| | | Mg./cc. | Percent w./v. | Mg./ml. | Percent w./v. |
| 1 | 5-Acetamido-1,3,4-thiadiazole-2-sulfonamide | 0.70 | 0.07 | 11.1 | 1.1 |
| 2 | 5-Acetylimino-4-methyl-$\Delta^2$-1,3,4-thiadiazoline-2-sulfonamide. | 0.73 | 0.07 | 8.0 | 0.8 |
| 3 | Methylene bis derivative of 2-acetamido-1,3,4-thiadiazole-5-sulfonamide. | 0.25 | 0.03 | 98.4 | 9.8 |
| 4 | 5-Acetamido-N-piperidinomethyl-1,3,4-thiadiazole-2-sulfonamide. | 10.12 | 1.01 | 43.7 | 4.4 |
| 5 | HCl salt of 5-acetamino-N-piperidinomethyl-1,3,4-thiadiazole-2-sulfonamide. | 1.55 | 0.16 | | |
| 6 | 5-Propionamido-N-piperidinomethyl-1,3,4-thiadiazole-2-sulfonamide. | 10.69 | 1.07 | 88.0 | 8.8 |
| 7 | HCl salt of 5-propionamido-N-piperidinomethyl-1,3,4-thiadiazole-2-sulfonamide. | 1.36 | 0.14 | | |
| 8 | 5-Butyramido-N-piperidinomethyl-1,3,4-thiadiazole-2-sulfonamide. | 3.3 | 0.33 | 78.2 | 7.8 |
| 9 | 5-Isobutyramido-N-piperidinomethyl-1,3,4-thiadiazole-2-sulfonamide. | 2.5 | 0.25 | 94.9 | 9.5 |
| 10 | 5-Acetylimino-4-methyl-N-piperidinomethyl-$\Delta^2$-1,3,4-thiadiazoline-2-sulfonamide. | 12.5 | 1.3 | 81.5 | 8.2 |

In Table I above are listed approximate solubility values for the Mannich base derivatives of acetazolamide and several of their analogues in water and proylene glycol. The method used for determining the water solubility values is to stir a saturated aqueous solution with an excess of the compound, filter and then to ascertain the solid content in a given volume of the solution by evaporation.

The method used for determining the solubility values in propylene glycol can be briefly outlined as follows. To about 3 to 5 ml. of warm (ca. 60–70° C.) propylene glycol is added with stirring sufficient material (ca. 300 to 700 mg.) in increments to form almost a saturated solution. The solution is permitted to stand at room temperature overnight. In each case some solid material has separated on standing. It is filtered, dried and weighed. The approximate solubility of each product in propylene glycol expressed in mg./ml. and percent w./v. is calculated and recorded.

EXAMPLE 7

Screening tests conducted on the acetazolamide analogues to determine diuretic properties of these compounds is carried out using the methods involved in studies described by Cummings et al., J. Pharmacol, and Exp. Therap. 128, 414–418 (April 1960).

Data on the diuretic activity of the compounds in rats is presented in Table II and in dogs in Table III which follow.

TABLE II.—DIURETIC ACTIVITY STUDIES IN THE RAT

| No. | Description | Dose (mg./rat) | Urine Volume | | Chloride | |
|---|---|---|---|---|---|---|
| | | | 0-5 hrs. | 0-25 hrs. | 0-5 hrs. | 0-24 hrs. |
| 1 | 2-Acetylamino-1,3,4-thiadiazole-5-sulfonamide. | 10 | 290 | | −22 | |
| 2 | 5-Acetylimino-4-methyl-Δ²-1,3,4-thiadiazoline 2-sulfonamide. | 5 | 227 | 47 | −39 | −33 |
| 3 | 5-Acetamino-N-piperidinomethyl-1,3,4-thiadiazole-2-sulfonamide. | 10 | 328 | 49 | −6 | −16 |
| 4 | 5-Propionamido-N-piperidinomethyl-1,3,4-thiadiazole-2-sulfonamide. | 10 | 364 | 50 | −5 | −30 |
| 5 | 5-Butyramido-N-piperidinomethyl-1,3,4-thiadiazole-2-sulfonamide. | 10 | 366 | 93 | 52 | 33 |
| 6 | 5-Isobutyramido-N-piperidinomethyl-1,3,4-thiadiazole-2-sulfonamide. | 10 | 450 | 97 | 32 | 35 |
| 7 | 5-Acetylimino-4-methyl-N-piperidinomethyl-Δ²-1,3,4-thiadiazoline-2-sulfonamide. | 10 | 533 | 100 | 31 | −36 |

TABLE III.—DIURETIC ACTIVITY STUDIES IN THE DOG

| No. | Description | Dose (mg./kg.) | Period (Hours) | Urine Flow (Hours) | Milliequivalent of Ion Excreted | | |
|---|---|---|---|---|---|---|---|
| | | | | | Sodium | Potassium | Chloride |
| 1 | 2-Acetylamino-1,3,4-thiadiazole-5-sulfonamide | 10 | 0-6 | 246 | 16.1 | 8.9 | 6.2 |
| | | | 0-24 | 346 | 2.1 | 21.0 | 11.4 |
| 2 | 5-Acetamino-N-piperidinomethyl-1,3,4-thiadiazole-2-sulfonamide. | 10 | 0-6 | 251 | 8.2 | 3.7 | 2.1 |
| | | | 0-24 | 308 | 8.9 | 6.4 | 3.0 |
| 3 | 5-Butyramido-N-piperidinomethyl-1,3,4-thiadiazole-2-sulfonamide. | 10 | 0-6 | 382 | 13.4 | 8.3 | 7.7 |
| | | | 0-24 | 422 | 13.8 | 12.4 | 8.6 |
| 4 | 5-Isobutyramido-N-piperidinomethyl-1,3,4-thiadiazole-2-sulfonamide. | 10 | 0-6 | 303 | 11.0 | 4.2 | 2.8 |
| | | | 0-24 | 364 | 12.2 | 7.6 | 7.2 |
| 5 | 5-Acetylimino-4-methyl-N-piperidino methyl-Δ²-1,3,4-thiadiazoline-2-sulfonamide. | 10 | 0-6 | 270 | 8.1 | 3.6 | 2.5 |
| | | | 0-24 | 330 | 9.2 | 6.1 | 4.2 |

A study of data in rats (Table II) indicates that in the diuretic 0 to 5 hour urine volume screening test (at a dose of 10 mg. per rat) all compounds were accepted for additional testing. At the dose level used in the test all compounds produced a greater rate of urine flow in the 5 and 24 hour test than acetazolamide itself. In the chloride excretion test, several of the new acetazolamide analogues, particularly compounds 5 and 6 are appreciably more efficient as chloride excretors than acetazolamide itself in the 0 to 5 hour test.

An inspection of Table III reveals that in general the urinary electrolyte patterns obtained in dogs on the test compounds listed resemble that of acetazolamide, that is, they appear to be carbonic anhydrase inhibitors. The urine flow produced in all cases compared favorably or exceeded that produced by acetazolamide itself. The milliequivalents of sodium, potassium and chloride ion by the test compounds were somewhat lower than that effected by acetazolamide.

EXAMPLE 8

5-acetamido-N-diethylaminomethyl-1,3,4-thiadiazole-2-sulfonamide

Into 20 ml. of methanol is added 4.4 g. (0.02 mole) of 5-acetamido-1,3,4-thiadiazole-2-sulfonamide and 4.1 ml. (0.04 mole) of diethylamine. To the mixture is added 4.3 ml. (0.05 mole) of 37% formaldehyde solution. The resulting clear solution is stirred for four hours and allowed to stand overnight. The reaction mixture is taken to dryness and the residue dried under reduced pressure at 40-50° C. Yield, 6.0 g. (98.5%).

EXAMPLE 9

5-acetamido-N-carboxymethylaminomethyl-1,3,4-thiadiazole-2-sulfonamide

Into 50 ml. of methanol is added 4.4 g. (0.02 mole) of 5-acetamido-1,3,4-thiadiazole-2-sulfonamide, 3.0 g. (0.04 mole)) of glycine and 4.3 ml. (0.05 mole) of 37% formaldehyde solution. Sufficient saturated sodium hydroxide solution is added to raise the apparent pH of the mixture to about 7.5 and the mixture stirred for four hours. Distilled water is then added and the precipitate collected by filtration, washed with water and dried under reduced pressure. Yield, 5.0 g. (82%).

EXAMPLE 10

5-acetamido-N-[N-methylpiperazinomethyl]-1,3,4-thiadiazole-2-sulfonamide

Into 30 ml. of methanol is added 4.4 g. (0.02 mole) of 5-acetamido-1,3,4-thiadiazole-2-sulfonamide, 4.0 g. (0.04 mole) N-methylpiperazine and 4.3 ml. (0.05 mole) of 37% formaldehyde solution. The resulting clear solution is stirred for 3 hours and allowed to stand overnight. The precipitate that separated with standing is collected and dried under reduced pressure.

We claim:
1. A compound of the formula:

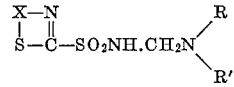

wherein X is a divalent radical of the group consisting of

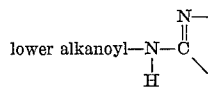

and

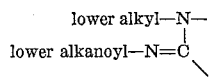

radicals and R and R' are members of the group consisting of hydrogen, lower allkyl and carboxy-lower alkyl and when taken together with the nitrogen atom form a heterocyclic radical selected from the group consisting of piperidino, pyrrolidino, morpholino, piperizino and N-methylpiperazino.

2. A compound of the formula:

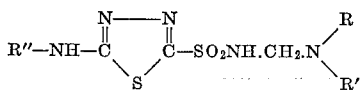

wherein R and R' are lower alkyl and R'' is lower alkanoyl.

3. A compound of the formula:

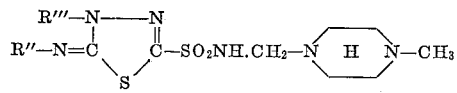

in which R'' is lower alkanoyl and R''' is a lower alkyl radical.

4. The compound 5-acetamido-N - piperidinomethyl-1,3,4-thiadiazole-2-sulfonamide.

5. The hydrochloric salt of 5-acetamido-N-piperidinomethyl-1,3,4-thiadiazole-2-sulfonamide.

6. The compound 5-acetylimino-4-methyl-N-piperidinomethyl-$\Delta^2$-1,3,4-thiadiazole-2-sulfonamide.

7. The compound 5-acetamido-N-morpholinomethyl-1,3,4-thiadiazole-2-sulfonamide.

8. The hydrochloride salt of 5-acetamido-N-morpholinomethyl-1,3,4-thiadiazole-2-sulfonamide.

9. The compound 5-acetamido-N-diethylaminomethyl-1,3,4-thiadiazole-2-sulfonamide.

10. The compound 5-acetamido - N - carboxymethylaminomethyl-1,3,4-thiadiazole-2-sulfonamide.

11. The compound 5-acetamido-N-[N-methylpiperazinomethyl]-1,3,4-thiadiazole-2-sulfonamide.

References Cited by the Examiner
UNITED STATES PATENTS
2,448,125   8/48   Sallman et al. _____ 260—404.5

NICHOLAS S. RIZZO, *Primary Examiner.*

UNITED STATES PATENT OFFICE
CERTIFICATE OF CORRECTION

Patent No. 3,213,092

October 19, 1965

George M. Sieger et al.

It is hereby certified that error appears in the above numbered patent requiring correction and that the said Letters Patent should read as corrected below.

Column 4, line 51, for "proylene" read -- propylene --; columns 5 and 6, Table III, column 6, line 2 thereof, for "2.1" read -- 26.1 --.

Signed and sealed this 26th day of July 1966.

(SEAL)
Attest:

ERNEST W. SWIDER
Attesting Officer

EDWARD J. BRENNER
Commissioner of Patents